(No Model.)

J. T. GURNEY.
CARRIAGE.

No. 247,628. Patented Sept. 27, 1881.

Witnesses:
W. B. Masson.
J. S. Barker.

Inventor:
J. Theodore Gurney
by Doubleday & Bliss
attys

UNITED STATES PATENT OFFICE.

J. THEODORE GURNEY, OF BOSTON, MASSACHUSETTS, ASSIGNOR OF ONE-HALF TO SAMUEL LITTLE, OF SAME PLACE.

CARRIAGE.

SPECIFICATION forming part of Letters Patent No. 247,628, dated September 27, 1881.

Application filed August 15, 1881. (No model.)

*To all whom it may concern:*

Be it known that I, J. THEODORE GURNEY, a citizen of the United States of America, residing at Boston, in the county of Suffolk and State of Massachusetts, have invented certain new and useful Improvements in Carriages; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in the construction of those vehicles whose parts are arranged to permit the front wheels to turn more or less under the front portion of the body of the vehicle. Its object is to provide a simply-constructed bracket or frame, which shall support not only the driver's seat and the foot-board, but also the front end of the body, and which shall operate as a rim for the seat and the foot-board.

Figure 1:
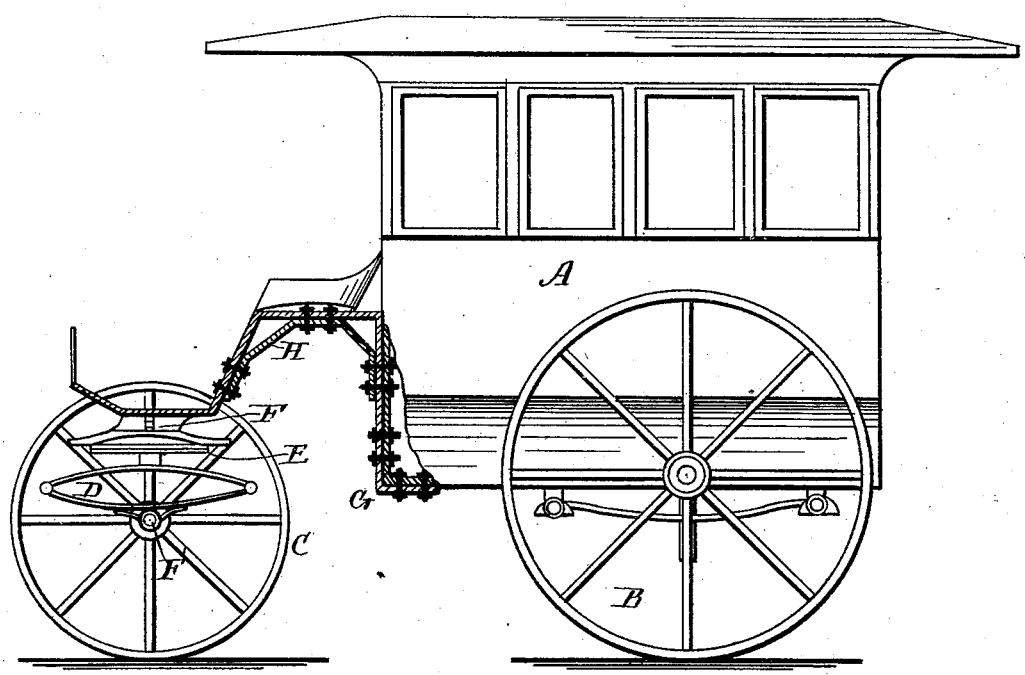
Figure 2:
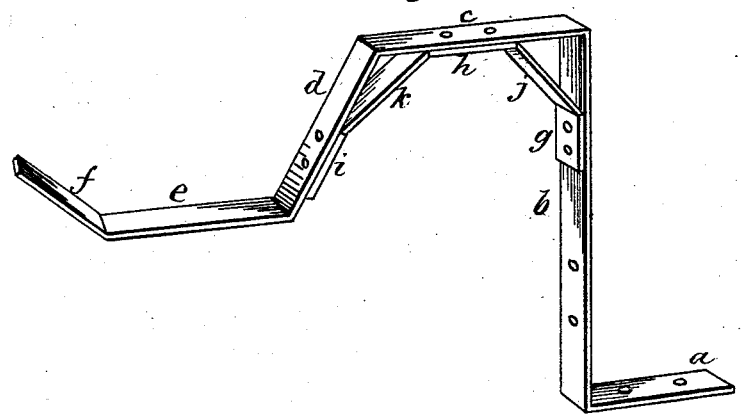

Figure 1 is a view, partly in side elevation and partly in section, of a vehicle embodying my invention. Fig. 2 is a view of one of the brackets or frame-pieces detached.

In the drawings, A represents the body of a coach, and B one of the wheels upon which said body is supported.

C represents one of the front wheels, which, and the gear-frame of which, are disconnected from the rear wheels and the rear gear-frame, except so far as they are connected therewith by the brackets, to be hereinafter described.

The spring or springs D, the fifth-wheel E, the bolster F, and the axle F' may be of any suitable character.

G represents a bracket, constructed of the shape shown, it having the horizontal portion $a$, the vertical part $b$, the seat part $c$, the inclined part $d$, the bottom part $e$, and the upwardly-inclined part $f$.

The lower horizontal part, $a$, is adapted to be placed under and secured to the bottom of the front part of the body of the carriage. The vertical portion $b$ rests against braces, and is bolted to the end of the body. The part $c$ supports the seat of the driver and the part $f$ serves to support the foot-rest.

The bolster F is bolted to the bottom part, $e$, and when thus connected these parts serve to connect the front gear-frame to the body and to support the body thereon.

There is a bracket upon each side of the carriage, similar to the one described, and in addition to their connecting the body and front gear they operate as rims at the ends of the seat and foot-board and act as sills for supporting the transverse parts of the front portion of the carriage-frame.

H represents a supplemental bracket, which is formed separate from, but can be firmly bolted to, the bracket G, already described. It is made with the parts $g$, $h$, and $i$, corresponding to the parts $b$, $c$, and $d$ of the bracket G, and by means of these the two brackets are brought closely together to permit of their being bolted.

The inclined parts $j$, $k$, and $l$ act as braces, and the whole forms a light but strong and durable supporting-frame.

What I claim is—

In a carriage of the character described, having the body mounted entirely in rear of the front wheels, the combination, with the body A and the front gear-frame, of the connecting-bracket G, forming the end rim of the seat, and having the lower horizontal part, $a$, beneath the front end of the body A, the bottom part, $e$, the seat part $c$, the connecting part $d$, and the vertical part $b$, which extends from the seat to a point below the bottom $e$, and which is bolted against the front end of the body A, substantially as set forth.

In testimony whereof I affix my signature in presence of two witnesses.

J. THEODORE GURNEY.

Witnesses:
SETH WHITTIER,
HENRY H. PAGE.